Nov. 7, 1933.  C. G. OLSON  1,933,871
LOCK WASHER
Filed May 31, 1930
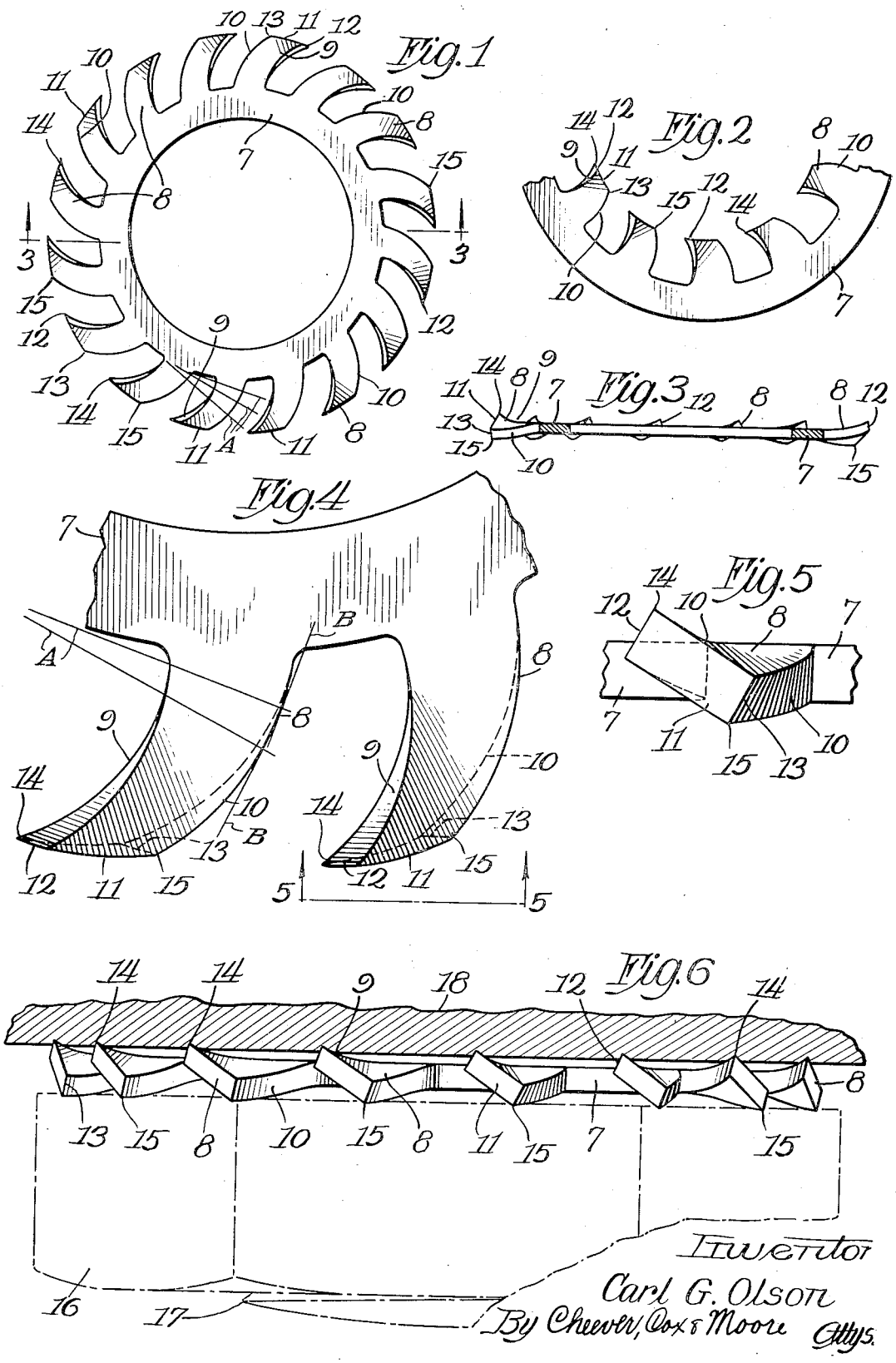
Inventor
Carl G. Olson
By Cheever, Cox & Moore Attys.

Patented Nov. 7, 1933

1,933,871

UNITED STATES PATENT OFFICE 1,933,871

LOCK WASHER

Carl G. Olson, Chicago, Ill., assignor to Shakeproof Lock Washer Company, Chicago, Ill., a corporation of Delaware Application May 31, 1930. Serial No. 458,018

7 Claims. (Cl. 151—35)

This invention relates to lock washers and particularly to that type of lock washer which has teeth projecting either inwardly or outwardly from the body or ring of the washer.

The primary object of the invention is to provide a new and improved washer which has teeth projecting therefrom, each of the teeth being twisted and having a relatively sharp work engaging point and a diagonally opposite relatively blunt work engaging point.

Another object of the invention is to provide a washer which has teeth extending from the body portion thereof, said teeth being substantially perpendicular to the body at their roots and curved spirally so that the cross sections thereof at any point will lie substantially in a plane tangential to a circle contained in the body of the washer.

A further object is to provide a washer having a body portion which has teeth extending substantially perpendicularly therefrom at the root, and the cross sections of which lie in planes tangential to circles included within the washer body, said teeth being twisted to provide a relatively sharp work engaging tooth and a tooth of lesser sharpness diagonally opposite the first mentioned tooth.

Numerous other objects and advantages will be apparent throughout the progress of the following specification.

The invention comprises in general a lock washer having an annular body portion from which twisted teeth project. These teeth extend from the body in a tangential relation, whereby the cross section of the teeth at any point lies substantially in a plane tangential to a circle included within the body of the washer. These teeth provide a relatively sharp pointed work engaging edge and a relatively blunt work engaging edge located diagonally opposite the first work engaging edge. The edges of both of the teeth are relatively sharp, the blunt edge being of an angle greater than ninety degrees, while the pointed or sharp edge is at an angle less than ninety degrees. The blunt edge is adapted to bite into metal, while the sharper or pointed edge is adapted to bite or imbed itself into a softer material, such as wood. The blunter edges of the teeth cut into the metal to maintain it in proper position, while the sharper or pointed edges imbed more readily into a softer material, such as wood. The teeth are twisted so that tightening movement may be effected while retrograde movement will be prevented.

The accompanying drawing illustrates a selected embodiment of the invention and the views therein are as follows:

Fig. 1 is a detail plan view of one form of the improved washer.

Fig. 2 is a fragmentary plan view of another type of lock washer.

Fig. 3 is a detail sectional view on the line 3—3 of Fig. 1.

Fig. 4 is a detail plan view of a part of the washer shown in Fig. 1 on a greatly enlarged scale.

Fig. 5 is a detail elevation looking in the direction of the arrows on the line 5—5 of Fig. 4.

Figure 6 is an enlarged view in elevation showing the improved washer positioned on the work.

Referring to the drawing, and particularly to Figs. 1 and 3 to 6, 7 designates a ring or body portion from which integral teeth 8 extend outwardly. These teeth are substantially perpendicular to the body portion at their roots and have inner curved sides 9, outer curved sides 10, and outer edges 11. In Figs. 1 and 4 lines are shown which extend transversely of the spiral washer teeth, and it will be noted that these lines are tangent to a circle which is contained within the body portion of the washer, said lines traversing the washer tooth at substantially right angles with respect thereto. From this disclosure it will be apparent that the teeth are curved spirally so that their cross sections at any point lie substantially in planes tangential to a circle contained in the body or ring of the washer.

These teeth are twisted, the side 10 inclining downwardly and the side 9 inclining upwardly. The side 9 and edge 11 form an angle of less than ninety degrees forming a relatively sharp edge 12, while the angle formed by the side 10 connecting with the edge 11 forms an angle of greater than ninety degrees, thereby forming a relatively blunt edge 13.

In Fig. 2 there is shown a washer with the teeth 8 extending inwardly from the body 7 instead of projecting outwardly as shown in the balance of the figures. These teeth also have the relatively sharp edge 12 and the relatively blunt edge 13, the angle presenting the blunt edge being more than ninety degrees, while the angle which presents the sharp edge is less than ninety degrees. The teeth are twisted to provide the work engaging points 14 and 15, the point 14 being relatively sharp, while the point 15 is not quite as sharp as the point 14 because the angle of the outer edge 11 of the tooth relative to the side 10 is greater than the angle formed by the edge 11 relative to the side 9.

The shape of the teeth is rectangular in cross section so that the sharp point 14 is located diagonally opposite the point 15. The point 15 is adapted to engage a hard surface such as metal, while the sharp point 14 is adapted to engage and dig into relatively soft material, such as wood, aluminum or other softer material. The teeth are twisted so that fastening means, such as a nut 16 threaded on the bolt 17, Fig. 6, will be permitted to be tightened, but will be prevented from retrograding. In Fig. 6 the washer is arranged between the work 18, which in the present instance designates wood, aluminum, or the like, and the metal nut 16. The tightening of the nut 16 on the bolt 17 will cause the sharp points 14 to dig into the wood work 18 and the point 15 to dig into the nut 17.

The invention provides a lock washer which has a plurality of either external or internal substantially tangentially twisted teeth. The tangential arrangement of the teeth causes them to have relatively sharp points for engaging a softer surface, such as wood, and lesser sharp points for engaging harder material, such as metal. The washer may be readily and economically manufactured, prevents retrograde movement of a tightening means on the work, and provides an excellent arrangement or locking means between materials of different characteristics, such as wood and metal, the sharp points digging into the softer material, while the lesser sharp points bite into the harder material. It will also be apparent from the foregoing that the teeth of my improved washer are curved so that lines A shown in Figs. 1 and 4, drawn across any part of the tooth perpendicular to companion tangents B, Figure 4, are substantially tangent to a circle contained within the ring or body of the washer. In other words, the lines A are radially disposed with respect to the curvature or spiral configuration of the prong and, if extended, will terminate at or within the body portion 7 of the washer. This geometric description of the prong construction is presented merely for the purpose of more clearly explaining and claiming my invention. In the particular embodiment shown in the drawing these lines are tangent to the periphery of the body portion. Obviously the tooth could be formed so that the transverse cross sectional lines of the tooth would be perpendicular to circles having a lesser diameter than the periphery of the washer body. In other words, while the curves of the teeth in the drawing are substantially of involute form, it should be understood that said curve may be generated from different diameter base circles, each of which would come within the outside diameter of the body of the washer. It should also be understood that my invention contemplates the use of teeth other than the curved teeth, said contemplated teeth being disposed at an angle to a radial line of the washer, the axis of each tooth being tangent to a circle within the outside diameter of the washer ring.

Changes may be made in the form, construction, and arrangement of the various parts without departing from the spirit of the invention or sacrificing any of its advantages, and the right is hereby reserved to make all such changes as fairly fall within the scope of the following claims.

The invention is hereby claimed as follows:

1. A lock washer having spirally disposed teeth having diagonally disposed surface engaging points extending out of the plane of the washer stock, one of said points being relatively sharp pointed.

2. A lock washer having spirally disposed teeth having diagonally disposed surface engaging points extending out of the plane of the washer stock, one of said points being relatively sharp pointed, the other point being less sharp.

3. A lock washer having spirally disposed teeth having diagonally disposed surface engaging points extending out of the plane of the washer stock, one of said points being relatively sharp pointed, the other point being less sharp, one of said points lying in a different horizontal plane than the other.

4. A lock washer comprising a body portion of flat spring stock, prongs extending from and formed integral with said body portion, each of said prongs having oppositely disposed side edges, and a circumferentially positioned edge connecting the side edges, the included angle between one of said side edges and said circumferentially positioned edge being less than 90 degrees and the included angle between the other side edge and said circumferentially positioned edge being greater than 90 degrees, each of said prongs being warped out of the plane of the washer stock, whereby work engaging corners of different degrees of sharpness are presented on opposite sides of the washer stock.

5. A lock washer comprising an annular body portion, and a plurality of marginal curved prongs extending outwardly from and formed integral with said body portion and warped so as to present work engaging teeth positioned out of the plane of the body portion, the curvature of the prongs being such that all of the lines of cross-section extending radially with respect to the curvature of said prongs, if extended, will intercept the body portion of the washer.

6. A lock washer comprising an annular body portion, and a plurality of external marginal curved prongs extending from and formed integral with said body portion and warped so as to present work engaging teeth positioned out of the plane of the body portion, the curvature of the prongs being such that all of the lines of cross-section extending radially with respect to the curvature of said prongs, if extended, will be tangent to a circle of smaller diameter than the diameter of the circle which determines the outer extremities of the washer teeth.

7. A lock washer comprising an annular body portion of flat spring stock, and a plurality of marginal teeth extending from and formed integral with said body portion, the body of each prong in plan presenting a curved member extending from the annular washer body, each of said prongs being warped out of the plane of the body so as to present work engaging corners on opposite sides of the body, the root of each prong being substantially radial with respect to the axis of the annular body portion.

CARL G. OLSON.